US009651133B2

United States Patent
Murphy et al.

(10) Patent No.: US 9,651,133 B2
(45) Date of Patent: May 16, 2017

(54) PHASED JOINT CAM

(71) Applicant: Google Inc., Mountain View, CA (US)

(72) Inventors: Michael Patrick Murphy, Arlington, MA (US); Christopher Everett Thorne, Somerville, MA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/613,427

(22) Filed: Feb. 4, 2015

(65) Prior Publication Data
US 2016/0223057 A1    Aug. 4, 2016

(51) Int. Cl.
| | |
|---|---|
| *F16H 21/00* | (2006.01) |
| *F16H 53/08* | (2006.01) |
| *F16H 25/14* | (2006.01) |
| *F16H 53/02* | (2006.01) |
| *F01B 9/06* | (2006.01) |
| *F15B 15/06* | (2006.01) |

(52) U.S. Cl.
CPC .............. *F16H 53/08* (2013.01); *F01B 9/06* (2013.01); *F16H 25/14* (2013.01); *F16H 53/02* (2013.01); *F15B 15/06* (2013.01)

(58) Field of Classification Search
CPC .......... F16H 53/06; F16H 53/08; F16H 51/00; F16H 53/02; F16H 25/00
USPC ........... 74/490.01, 490.05, 490.06, 567, 569; 623/59, 26; 123/23; 91/499, 471
See application file for complete search history.

(56) References Cited

U.S. PATENT DOCUMENTS

| | | | | |
|---|---|---|---|---|
| 3,818,771 A | * | 6/1974 | Kobelt | F16H 25/18 74/567 |
| 4,542,660 A | * | 9/1985 | Kato | F15B 7/08 74/27 |
| 4,584,915 A | * | 4/1986 | Ichiyanagi | B23Q 5/341 318/578 |

(Continued)

FOREIGN PATENT DOCUMENTS

| | | |
|---|---|---|
| CN | 103437819 | 12/2013 |
| DE | 3522171 | 1/1987 |

(Continued)

OTHER PUBLICATIONS

International Search Report, International Application No. PCT/US2016/012505, mailed Sep. 19, 2016.

*Primary Examiner* — William Kelleher
*Assistant Examiner* — Zakaria Elahmadi
(74) *Attorney, Agent, or Firm* — McDonnell Boehnen Hulbert & Berghoff LLP

(57) ABSTRACT

The present disclosure relates to a system that uses linear actuators to generate a torque on a shaft. In an example implementation, a system may include a shaft and an attached cam. The cam includes an involute portion. The system also includes a first linear actuator and a second linear actuator configured to move along a first axis and a second axis, respectively. The linear actuators are configured to detachably couple to the cam based on at least a reference angle of the shaft. That is, as the shaft rotates about its rotational axis at the reference angle, the first and the second linear actuators may couple to, and decouple from, various portions of the cam. As the linear actuators couple to, and decouple from, the various portions of the cam, different rotational torques and/or different ranges of such torques may be imparted onto the shaft.

17 Claims, 14 Drawing Sheets

(56) References Cited

U.S. PATENT DOCUMENTS

| | | | | |
|---|---|---|---|---|
| 4,854,236 A | * | 8/1989 | Thunker | B41F 21/10 |
| | | | | 101/411 |
| 4,966,067 A | | 10/1990 | Ames et al. | |
| 5,327,860 A | * | 7/1994 | Kruger | F01L 1/25 |
| | | | | 123/90.48 |
| 5,924,334 A | * | 7/1999 | Hara | F01L 13/0021 |
| | | | | 123/90.17 |
| 6,000,298 A | * | 12/1999 | Kato | F16H 33/02 |
| | | | | 100/282 |
| 6,688,267 B1 | * | 2/2004 | Raghavan | F01L 1/34 |
| | | | | 123/90.15 |
| 6,840,170 B2 | * | 1/2005 | Becker | B41F 21/106 |
| | | | | 101/216 |
| 8,047,094 B2 | | 11/2011 | Love et al. | |
| 8,156,834 B2 | | 4/2012 | Chiang et al. | |
| 8,951,303 B2 | * | 2/2015 | Dehoff | A61F 2/583 |
| | | | | 602/21 |
| 2006/0130791 A1 | | 6/2006 | Lee | |
| 2007/0295300 A1 | | 12/2007 | Zhao | |
| 2010/0147233 A1 | * | 6/2010 | Firey | F02B 45/08 |
| | | | | 123/23 |
| 2012/0067317 A1 | * | 3/2012 | Towne | F02B 75/06 |
| | | | | 123/192.1 |
| 2014/0165775 A1 | * | 6/2014 | Towne | F16F 15/005 |
| | | | | 74/567 |

FOREIGN PATENT DOCUMENTS

| | | |
|---|---|---|
| DE | 3720567 | 1/1989 |
| EP | 0702128 | 3/1996 |
| FR | 1381162 | 12/1964 |
| GB | 457876 | 12/1936 |
| GB | 1217134 | 12/1970 |
| WO | 2010099175 | 9/2010 |

* cited by examiner

PHASED JOINT CAM

BACKGROUND

A mechanical system may translate a linear force to a rotational force. For example, a cam assembly may include a shaft and an attached cam. A linear actuator may couple to the attached cam. The linear actuator may impart a linear force on the attached cam, which may in turn provide a rotational torque on the shaft.

SUMMARY

In a first aspect, a system is provided. The system includes a shaft configured to rotate about a rotational axis. The system also includes at least one cam coupled to the shaft. A cross-section of the at least one cam includes an approximately involute portion. The system additionally includes a first linear actuator configured to move along a first axis and a second linear actuator configured to move along a second axis. The first linear actuator and the second linear actuator are configured to couple to the at least one cam. The first linear actuator and the second linear actuator are further configured to exert a force on the at least one cam so as to impart a torque on the shaft.

In a second aspect, a system is provided. The system includes a shaft configured to rotate about a rotational axis. The system also includes a first cam coupled to the shaft. A cross-section of the first cam includes an involute portion. The system additionally includes a second cam coupled to the shaft. A cross-section of the second cam includes an involute portion. The system yet further includes a first linear actuator configured to move along a first axis. The first linear actuator is configured to couple to the involute portion of the first cam. The system includes a second linear actuator configured to move along a second axis. The second linear actuator is configured to detachably couple to the second cam based on at least one of a reference angle of the shaft and a reference position of the second linear actuator along the second axis.

Other aspects and implementations will become apparent to those of ordinary skill in the art by reading the following detailed description, with reference where appropriate to the accompanying drawings.

DETAILED DESCRIPTION

I. Overview

Figure 1A:
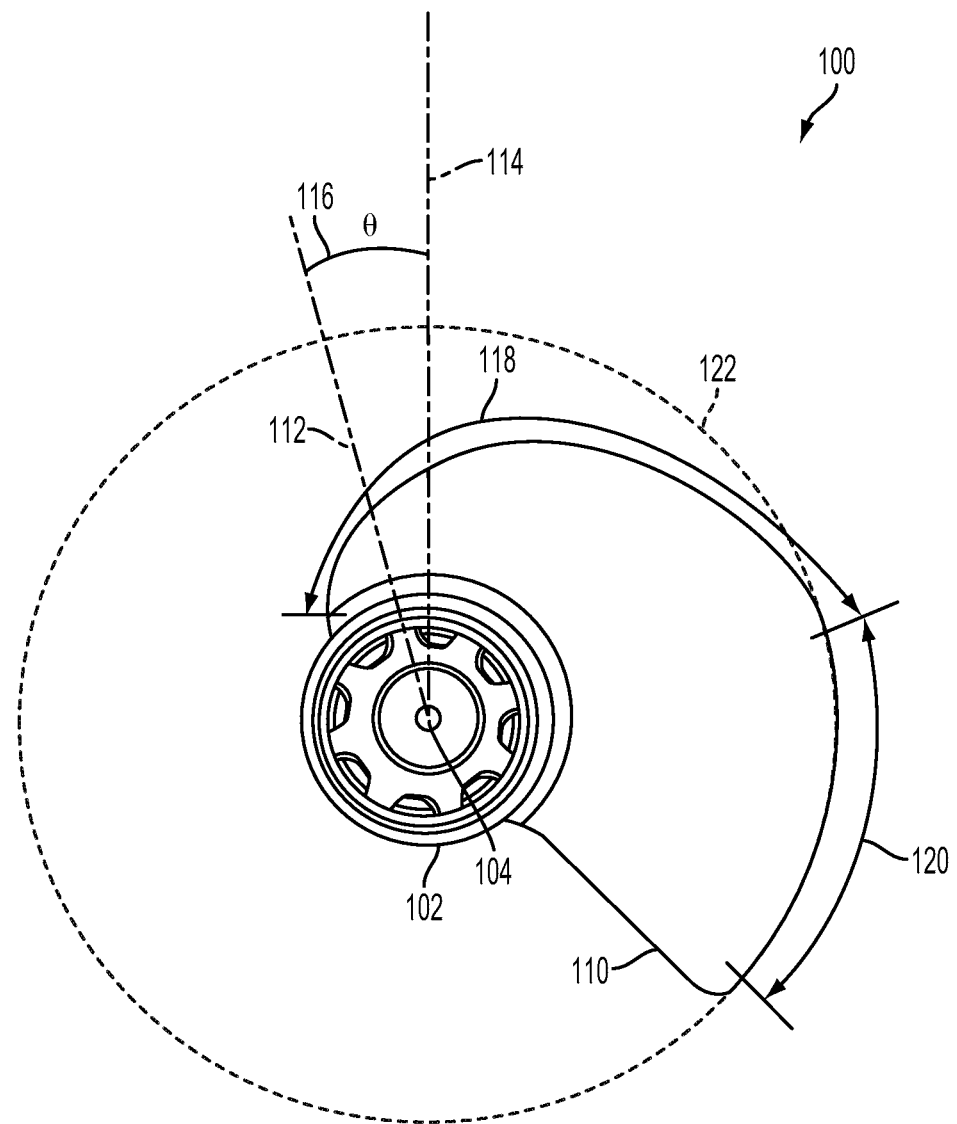
FIG. 1A illustrates a view of a system, according to an example implementation.

The present disclosure may generally relate to a system that translates linear motion into a torque on a shaft. In an example implementation, a system may include a shaft with a cam that includes an involute portion. The system also includes a first linear actuator configured to move along a first axis and a second linear actuator configured to move along a second axis. The first linear actuator and the second linear actuator are configured to couple to the at least one cam. Furthermore, the first linear actuator and the second linear actuator are configured to exert a force on the at least one cam so as to impart a torque on the shaft. The cam may optionally include circular or approximately circular portions.

In an example embodiment, the first linear actuator and the second linear actuator may be configured to couple to the same cam. Alternatively, the first linear actuator and the second linear actuator may be configured to couple to separate cams.

The first linear actuator and/or the second linear actuator may be configured to disengage from the at least one cam. In such a scenario, disengaging from the at least one cam may include the first linear actuator or the second linear actuator imparting a lower torque on the shaft compared to a torque applied to the shaft when a respective linear actuator is engaged. In some embodiments, a disengaged linear actuator may impart substantially zero torque on the shaft. The lower-torque situation may arise under various conditions.

For example, while the first linear actuator or the second linear actuator are coupled to the approximately circular portion of the at least cam, a force imparted by one of the linear actuators onto the cam may be directed towards the rotational axis. Thus, a lower torque may be imparted on the shaft, compared to the torque imparted on the shaft while the linear actuator is engaged.

In another example embodiment, at least one of the first linear actuator or the second linear actuator may be configured to decouple from the at least one cam based on at least one of a reference position of the first linear actuator or a reference position of the second linear actuator. For instance, the first linear actuator and/or the second linear actuator may come into contact with a stop. The stop may prevent the first linear actuator and/or the second linear actuator from physically coupling with the at least one cam. In such a scenario, a lower, or zero, torque may be imparted on the shaft due to the decoupling.

In yet another example embodiment, a hydraulic or pneumatic pressure of at least one of the first linear actuator or the second linear actuator may be reduced or otherwise adjusted. The hydraulic or pneumatic pressure may be reduced or otherwise adjusted based on, for example, a reference angle of the shaft or a reference position of the first linear actuator and/or the second linear actuator.

The hydraulic or pneumatic pressure of the first linear actuator and/or the second linear actuator may be adjusted via a controller. For instance, the controller may open a pressure relief valve and/or adjust a valve position of a servovalve coupled to the first linear actuator and/or the second linear actuator. Other ways to change the pressure of the first linear actuator and the second linear actuator are discussed below.

In an example embodiment, the first linear actuator and the second linear actuator are configured to detachably couple to the cam based at least on a reference angle of the shaft. That is, as the shaft rotates about an axis of rotation with a reference angle, the first and the second linear actuators may couple to, and decouple from, various portions of the cam. Moreover, as the linear actuators couple to the various portions of the cam, different rotational torques, and/or ranges of torques may be imparted onto the shaft.

For instance, if both the first and the second linear actuators are coupled to the involute portion of the cam, both linear actuators may be operable to impart a torque on the shaft, which offers the possibility of a "high-torque" configuration or range. Alternatively or additionally, if only one of the first and the second linear actuators are coupled to the involute portion of the cam, only the linear actuator coupled to the involute portion may impart a torque on the shaft. This configuration may be a "medium-torque" configuration or range.

The involute portion of the cam may include a cross-sectional shape that is an involute about the shaft. Put another way, the cross-sectional shape may be an involute of a circle, where the circle is centered about the shaft's rotational axis. Furthermore, the involute portion of the cam may include a surface that provides a linear relationship between an axial displacement of a linear actuator and a rotational displacement of a point along the circumference of the circle.

The involute portion may include a cross-sectional shape that is an approximation of a "perfect" involute. For example, a cross-sectional area of the involute portion of the cam may be within 5% or 10% of the cross-sectional area of a perfect involute shape. Other approximations of an involute shape are possible.

Similarly, the circular portion of the cam may include an approximation of a circular shape. For example, the circular portion of the cam may not have a perfectly circular cross-section with respect to the axis of rotation of the shaft. As above, using a template metric, the circular portion of the cam may be within 5% or 10% of the perfect circular shape. Other approximations of a circular shape are possible.

Furthermore, the cam may include further portions. For example, the cam may include a transitional portion disposed along a circumference of the cam. In such a scenario, the transitional portion between the circular portion and the involute portion of the cam. The transitional portion may include a smoothly graded curve that provides a low-friction transition between the circular portion and the involute portions, with respect to the rotational axis of the shaft. Alternatively or additionally, the cam may include portions with other cross-sectional shapes.

In an example implementation, while a reference angle of the shaft is within a first angle range, both of the first and the second linear actuators may be coupled to the circular portion of the one or more cams. While the reference angle of the shaft is within a second angle range, one of the first and the second linear actuators may be coupled to the involute portion of the one or more cams and the other linear actuator may be coupled to the circular portion of the one or more cams. While the reference angle of the shaft is within a third angle range, both the first and the second linear actuators may be coupled to the involute portion of the one or more cams. While the reference angle of the shaft is within a fourth angle range, one of the first and the second linear actuators may be coupled to the involute portion of the one or more cams and the other linear actuator may be decoupled from the one or more cams. While the reference angle of the shaft is within a fifth angle range, both of the first and the second linear actuators may be decoupled from the one or more cams.

Other angle ranges are possible within the scope of the present disclosure. For example, further angle ranges may be associated with further torque ranges, further coupling arrangements between the cams and the linear actuators, etc.

In some implementations, a controller may be configured to release (or otherwise adjust) the hydraulic or pneumatic pressure of the first and/or the second linear actuator. The adjustment may be made in response to one or both of the linear actuators being decoupled from the one or more cams or coupled to the circular portion of the one or more cams. For example, the controller may be configured to open a vent port of one or both of the linear actuators while an actuator position is within a predetermined range along a respective first and/or second axis. Other ways to release pressure from the linear actuators are possible.

Further, the system may include one or more stops configured to decouple one or more of the linear actuators from the one or more cams while the actuator reference position is at a stop position. The stops may include a physical position of a bottom gland of a cylinder associated with the linear actuator. Other types of stops are possible.

Other implementations may include further linear actuators coupled to a plurality of cams. For example, the shaft may include a second cam and corresponding linear actuators configured to provide an antagonistic or opposing torque on the shaft. In yet further implementations, multiple linear actuators may interact with the cam and/or multiple involute/circular portions may incorporated into one or more cams.

II. Example Systems

FIG. 1A illustrates a view of a system 100, according to an example implementation. System 100 includes a shaft 102 with an axis of rotation 104. The system 100 may include a cam 110 coupled to the shaft 102. A reference angle 116 may be measured as an angle θ between a shaft position 112 and an origin position 114 with respect to the axis of rotation 104. Shaft 102 may be cylindrical. Alternatively, shaft 102 may be another shape. In some implementations, shaft 102 may be part of a mechanical joint.

The cam 110 may include a cross-sectional shape having an approximately involute portion 118. The cam 110 may optionally include a circular portion 120. Specifically, the approximately involute portion 118 may be configured or shaped such that a surface of the approximately involute portion 118 may be an involute curve with respect to a diameter and/or a cross-section of the shaft 102. As such, the Cartesian coordinates of the cross-section of the approximately involute portion 118 of cam 110 may be:

$$x = a(\cos\theta + \theta\sin\theta); \text{ and}$$

$$y = a(\sin\theta - \theta\cos\theta),$$ where a is the radius of the shaft 102 and θ is in radians.

The approximately involute portion 118 may include a cross-sectional shape that is an approximation of a "perfect" or "ideal" involute. For example, a cross-sectional area of the approximately involute portion 118 may be within 5% or 10% of the cross-sectional area of a perfect involute shape.

Other shapes that approximate an involute are possible for the approximately involute portion 118.

The circular portion 120 may include a surface of the cam 110 that coincides with an outer diameter 122 of the cam 110. Alternatively or additionally, the circular portion 120 may include a surface of the cam 110 that is parallel with the circumference of the shaft 102.

Figure 1B:
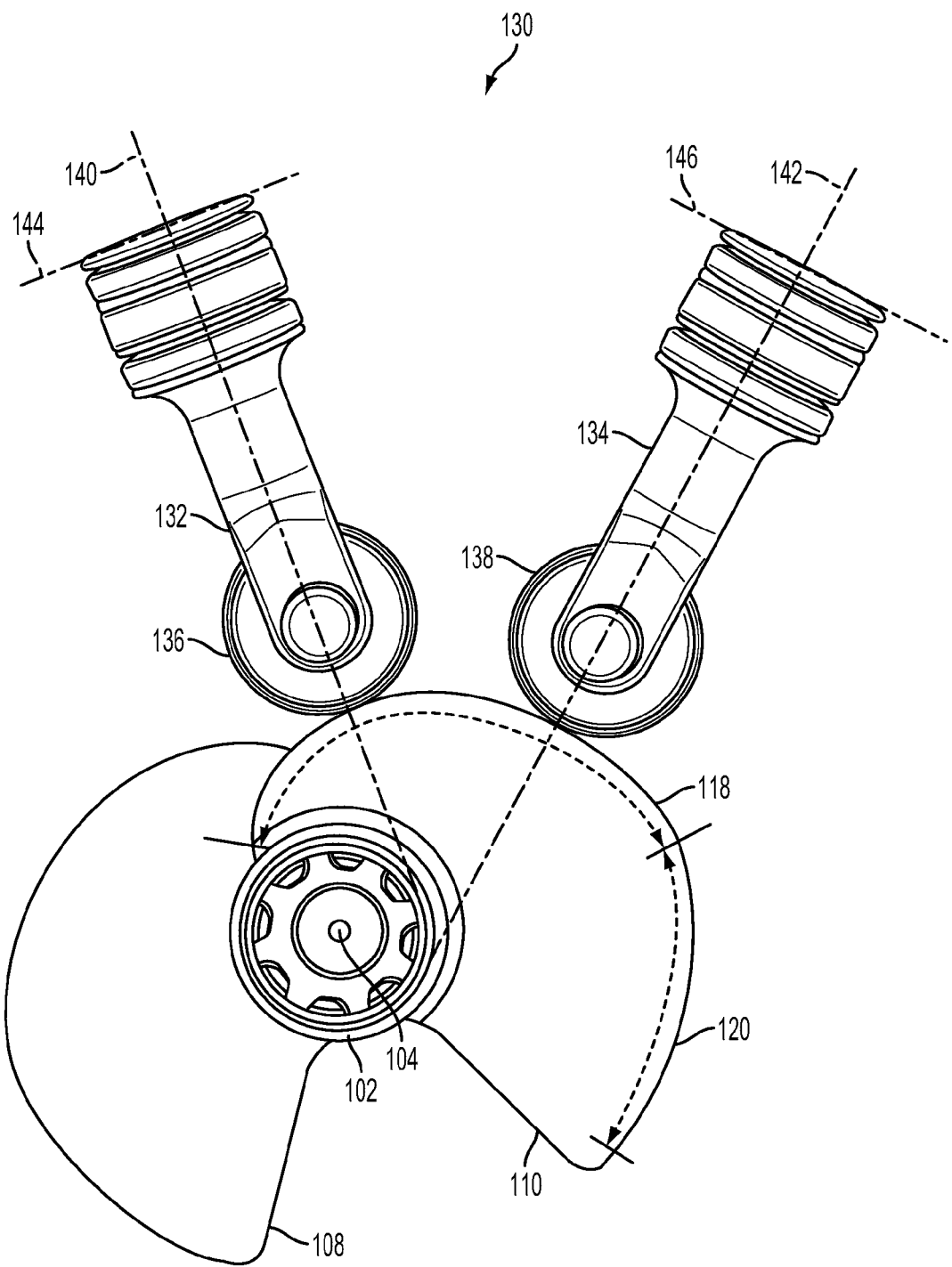
FIG. 1B illustrates a view of a system, according to an example implementation.

FIG. 1B illustrates a view of a system 130, according to an example implementation. System 130 may include similar or identical elements to those described with respect to system 100 and shown in FIG. 1A.

System 130 may further include a first linear actuator 132 and a second linear actuator 134. In an example implementation, the first linear actuator 132 and the second linear actuator 134 include hydraulic cylinders that may be controlled by a controller. Additionally or alternatively, the first linear actuator 132 and the second linear actuator 134 may include pistons, jackscrews, rigid chain actuators, or another type of actuator configured to provide a force substantially along a straight line. The first linear actuator 132 and the second linear actuator 134 may operate based on mechanical, hydraulic, pneumatic, or piezoelectric forces.

In an example implementation, the first linear actuator 132 and/or the second linear actuator 134 may include a single- or double-acting hydraulic cylinder. The first linear actuator 132 and the second linear actuator 134 may also each include a vent port. The vent port may be controllable via a port controller or the controller 172, as described below.

The first linear actuator 132 and the second linear actuator 134 may be configured to move along a first axis 140 and a second axis 142, respectively. Furthermore, the first linear actuator 132 and the second linear actuator 134 may be located at reference positions 144 and 146 along the first axis 140 and the second axis 142, respectively. The first linear actuator 132 and the second linear actuator 134 may be configured to move within a range of reference positions along their respective axes 140 and 142. In some implementations, one or more position sensors may be operable to provide a current reference position of at least one of the linear actuators.

As described above, the first linear actuator 132 and the second linear actuator 134 may include one or more stops that may limit the range of motion along the first axis 140 or the second axis 142, respectively. For example, the one or more stops may include a pre-set or pre-determined position of a bottom gland of the cylinder of the linear actuator. Alternatively, the one or more stops may include a physical stop that prevents a rod of the linear actuator from extending and/or retracting.

In an example implementation, the first linear actuator 132 and the second linear actuator 134 include cylindrical surfaces 136 and 138. The cylindrical surfaces 136 and 138 may be configured to detachably couple to the one or more cams, specifically cam 110. The cylindrical surfaces 136 and 138 may include cylindrical roller bearings and/or wheels. Alternatively, one or both of the first linear actuator 132 and the second linear actuator 134 need not include cylindrical surfaces 136 and 138.

With respect to the cam 110, the involute portion 118 may include a surface with a shape that provides a linear relationship between an axial displacement of a linear actuator (e.g. linear actuators 132 and 134) and a rotational displacement of the circumference of shaft 102. Put another way, while a given linear actuator is coupled to the approximately involute portion 118, forces may be transferred between the linear actuator and the approximately involute portion 118 with a force vector substantially collinear with the axis of motion of the given linear actuator.

In an example implementation, the first linear actuator 132 and the second linear actuator 134 may be operable to impart a torque on the shaft 102. Specifically, the first linear actuator 132 and the second linear actuator 134 may push on the cam 110 so as to impart a clockwise torque on the shaft 102 about the axis of rotation 104.

The first linear actuator 132 and the second linear actuator 134 may be configured to detachably couple to various portions of the cam 110. A combination of different coupling configurations may enable control over a range of torques that may be applied to the shaft 102. For example, the first linear actuator 132 and the second linear actuator 134 may both be coupled to the approximately involute portion 118. In such a scenario, both linear actuators may provide a torque on the shaft 102.

In a different example, the first linear actuator 132 may be coupled to the approximately involute portion 118 and the second linear actuator 134 may be coupled to the circular portion 120 of the cam 110. In such a scenario, the first linear actuator 132 may be operable to provide a torque on the shaft 102 and the second linear actuator 134 may only provide force to shaft 102 along a force vector that passes through the axis of rotation 104 (and thus would not produce a torque on shaft 102).

In a further example, one or both of the linear actuators may be physically decoupled from the cam 110. In such a scenario, a stop may be configured to decouple one or both of the linear actuators from the cam 110. Resultantly, the decoupled linear actuator would be unable to provide a torque on the shaft 102.

In some implementations, the system 130 may be configured as a cam rocker arm. That is, further linear actuators may be configured to detachably couple to cam 108 to provide, at least in part, an opposing (counterclockwise) torque on the shaft 102 about the axis of rotation 104. By coordinating the linear actuators, the shaft 102 may be configured to provide motion in both rotational directions.

Optionally, system 130 may include one or more further cams 108. Such further cams 108 may be configured to provide an opposing torque on the shaft 102. Alternatively or additionally such further cams 108 may configured to provide an increased range of motion and/or modify the range of torques that may be applied to the shaft 102.

Figure 1C:
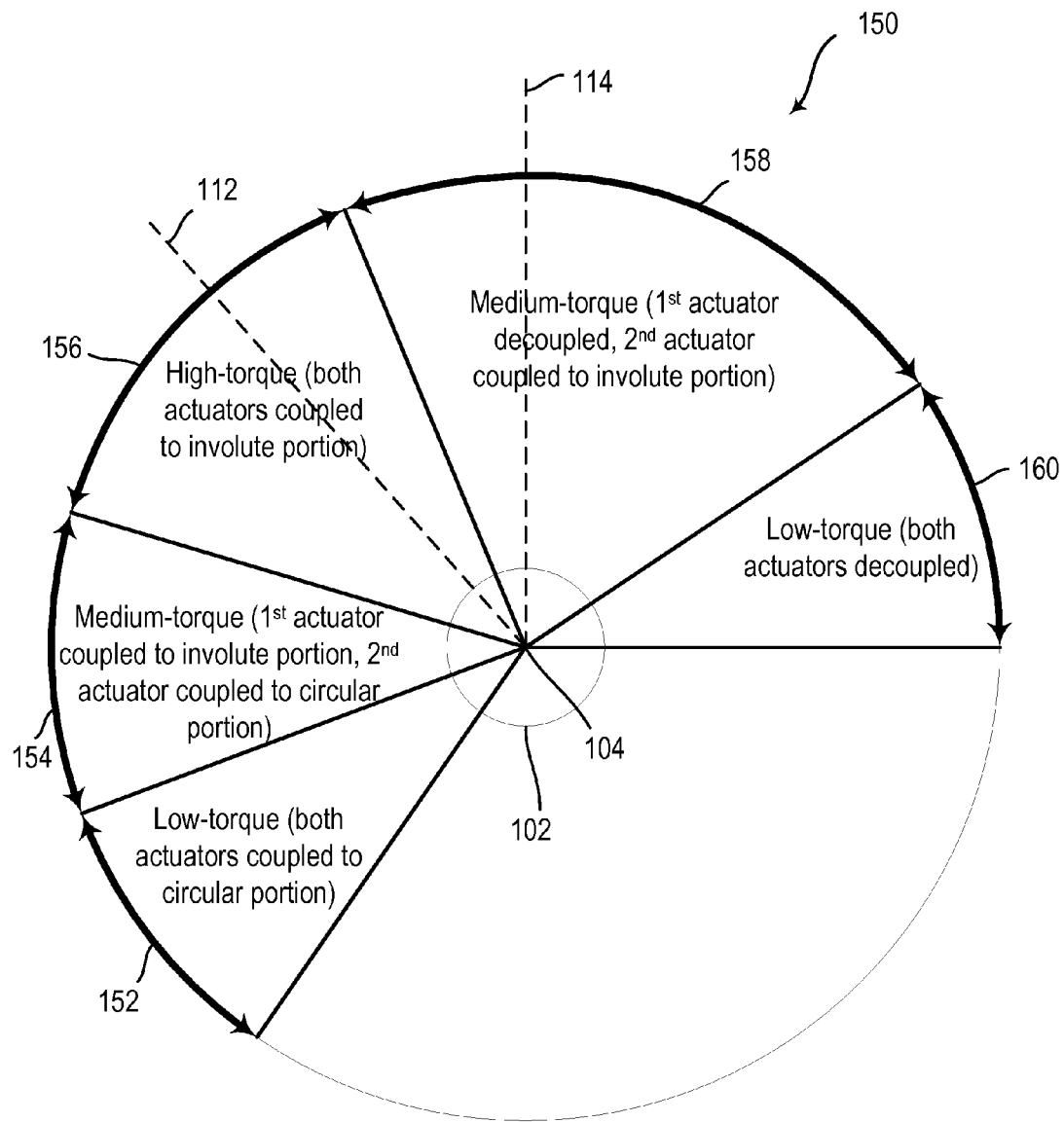
FIG. 1C illustrates a schematic diagram of various angle ranges, according to an example implementation.

FIG. 1C illustrates a schematic diagram of various angle ranges 150, according to an example implementation. The various angle ranges 150 may provide different torque ranges based on reference angle 116 of shaft 102. Again, reference angle 116 may be measured as an angle θ between a shaft position 112 and an origin position 114 with respect to the axis of rotation 104. For example, a first angle range 152 may represent a low-torque range when both linear actuators are coupled to the circular portion 120. As the shaft 102 rotates clockwise, a second angle range 154 may represent a medium-torque range at least because the first linear actuator 132 is coupled to the approximately involute portion 118 and the second linear actuator 134 is coupled to the circular portion 120. Moving clockwise, a third angle range 156 may represent a high-torque range at least because the first linear actuator 132 and the second linear actuator 134 may be coupled to the approximately involute portion 118. Moving further clockwise, a fourth angle range 158 may represent a medium-torque range at least because the first linear actuator 132 may be decoupled and the second linear actuator 134 may be coupled to the approximately involute portion 118. Moving yet further clockwise, a fifth angle range 160 may represent a low-torque range at least because both actuators are decoupled from the cam 110.

Figure 1D:
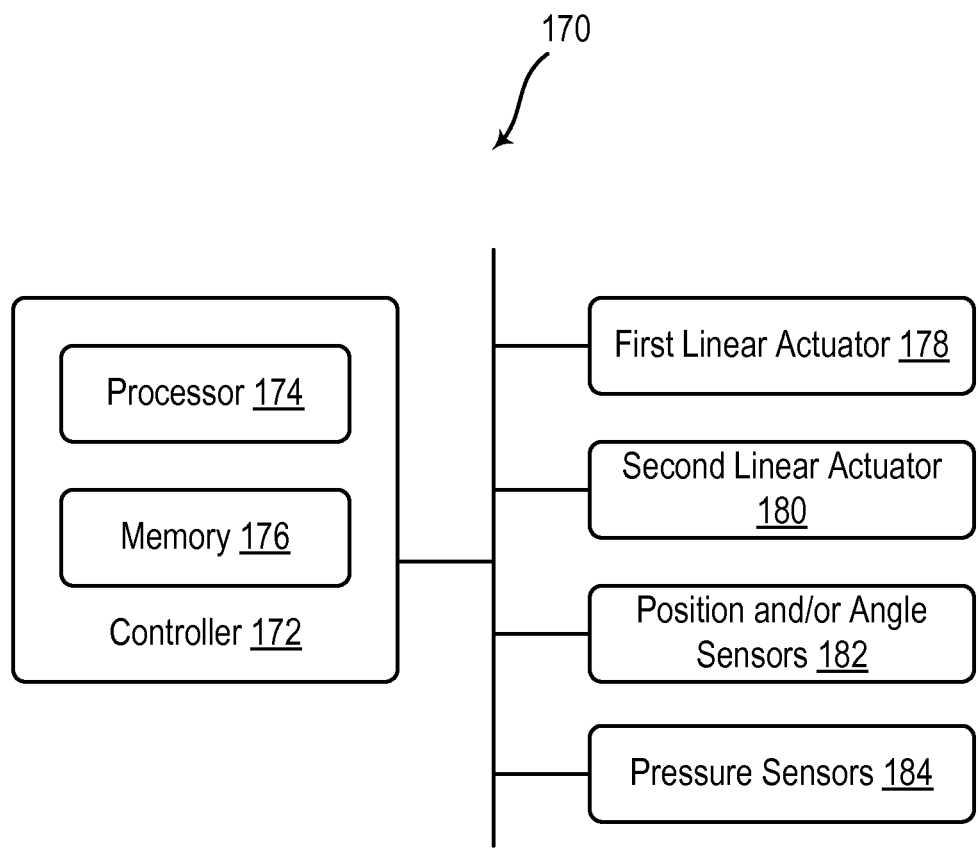
FIG. 1D illustrates a schematic diagram of a system, according to an example implementation.

FIG. 1D illustrates a schematic diagram of a system 170, according to an example implementation. The system 170 may include a controller 172. The controller 172 may include a processor 174 and a memory 176. Specifically, the controller 172 may be one or more computers. Alternatively or additionally, the controller 172 may represent a distributed computing platform.

The controller 172 may be communicatively coupled to a first linear actuator 178 and a second linear actuator 180. The first linear actuator 178 and the second linear actuator 180 may be similar or identical to the first linear actuator 132 and second linear actuator 134 as illustrated and described in reference to FIG. 1B. However, other linear actuators, such as the linear actuators described elsewhere herein, are possible.

The controller 172 may be further communicatively coupled to one or more position and/or angle sensors 182. The position and/or angle sensors 182 may include sensors configured to provide information about a position of the first linear actuator 178 and/or the second linear actuator 180. Alternatively or additionally, the position and/or angle sensors 182 may include one or more sensors configured to provide information about an angular position of the shaft 102. The position and/or angle sensors 182 may include any of a variety of sensors including ultrasonic, piezo-electric, magnetic, or capacitive transducers, photodetectors, and linear and rotary encoders. Other types of sensors are contemplated within the scope of this disclosure. In some implementations, position sensors such as Hall Effect sensors may be included into the first linear actuator 178 and/or the second linear actuator 180.

The controller 172 may be communicatively coupled to one or more pressure sensors 184. The pressure sensors 184 may be configured to provide information to the controller 172 related to a pressure of the first linear actuator 178 and/or the second linear actuator 180. For example, in the case where the linear actuators include hydraulic cylinders, the pressure sensors 184 may provide information about a hydraulic pressure of the cylinders. Other types of pressures sensors are possible.

The controller 172 may be configured to receive information from the position and/or angle sensors 182. The information may relate to the angular position of the shaft 102 and/or the position of the first linear actuator 178 and/or the second linear actuator 180.

The controller 172 may be further configured to determine whether a pressure should be adjusted related to the first linear actuator 178 or the second linear actuator 180 based on the information received from the position and/or angle sensors 182. The determination may also be based on information received from the pressure sensors 184, which may relate to a current pressure of a cylinder of the first and/or the second linear actuators 178 and 180.

In response to determining a pressure should be adjusted, the controller 172 may be configured to control a pressure of the first linear actuator 178 and/or the second linear actuator 180 based on their respective positions. Alternatively or additionally, the controller 172 may be configured to control the pressure of the linear actuators based on an angle of the shaft 102. In an example implementation the controller 172 may cause one or more ports of the linear actuators to be actuated so as to release, maintain, or increase pressure based on the angle of the shaft 102. However, other ways to control the torque or other forces applied to the shaft 102 are possible.

For example, the controller 172 may receive information related to the first linear actuator 178 being decoupled from the cam 110. In such a scenario, the controller 172 may determine that pressure should be released from the first linear actuator 178. Accordingly, the controller 172 may cause a hydraulic or pneumatic controller or the hydraulic or pneumatic cylinder itself to release pressure from the first linear actuator 178. In another example, the controller 172 may receive information related to the second linear actuator 180 being on the circular portion 120 of cam 110. In such a scenario, the controller 172 may determine that pressure should be released from the second linear actuator 180. Accordingly, the controller 172 may send a command to a hydraulic or pneumatic cylinder controller or the hydraulic or pneumatic cylinder itself in order to release the pressure of the second linear actuator 180. Alternatively or additionally, the controller 172 may be configured to release pressure from one or both of the linear actuators 178 and 180 based on an angle of the shaft 102. For example, the controller 172 may receive information from an angular encoder that the shaft position 112 is within a fifth "low-torque" angular range 160. In such a situation, the controller 172 may be configured to open one or more vent ports corresponding to both the first linear actuator 178 and the second linear actuator 180.

FIGS. 2A-2E may illustrate a common mechanical apparatus configured to translate linear force to a rotational torque on a shaft. Each of the FIGS. 2A-2E may describe a different system configuration of the common mechanical apparatus. That is, the common mechanical apparatus may be operable to conform to each of the described system configurations.

Figure 2A:
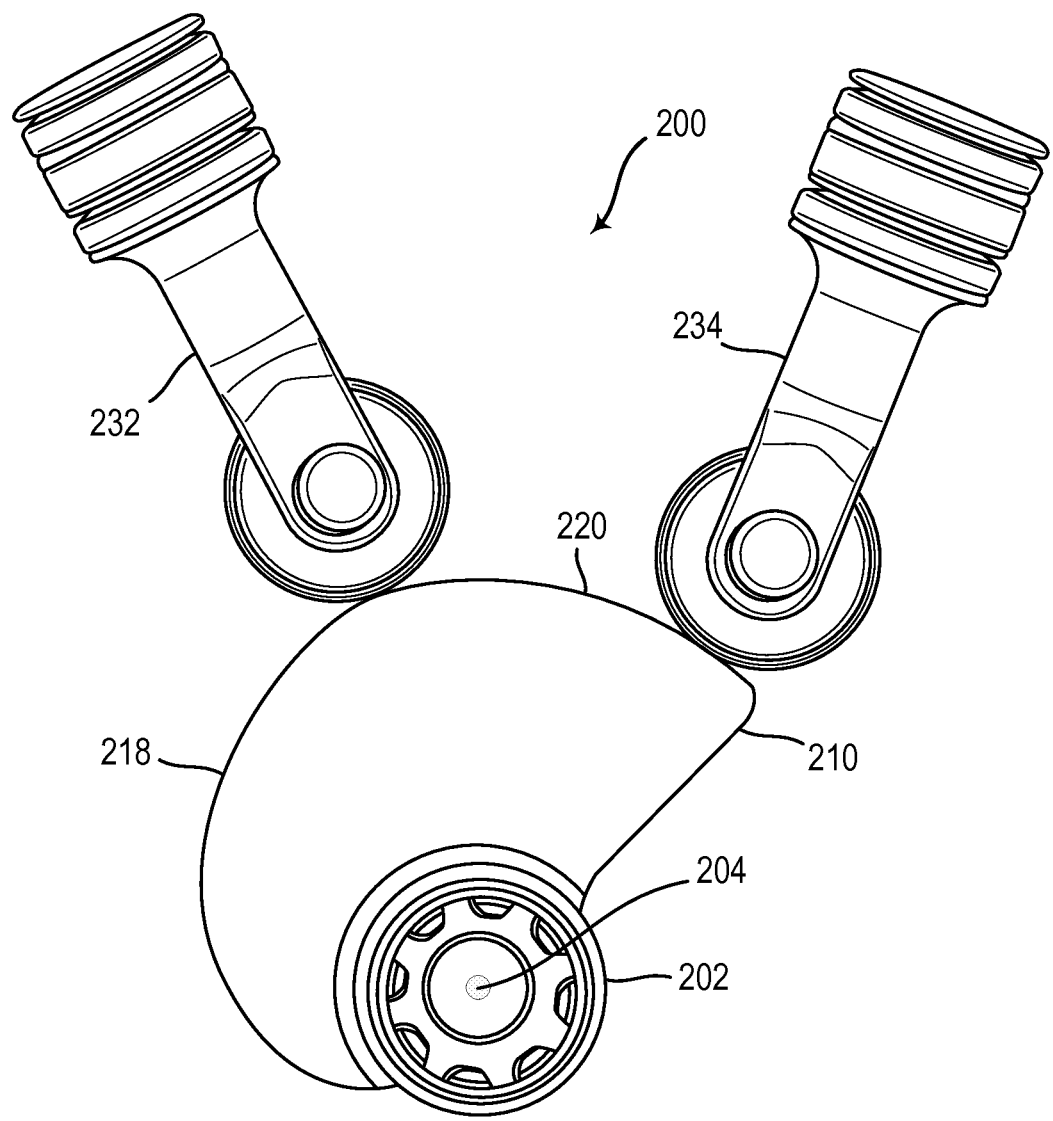
FIG. 2A illustrates a view of a system configuration, according to an example implementation.

FIG. 2A illustrates a view of a system configuration 200, according to an example implementation. System configuration 200 may include elements similar or identical to those disclosed elsewhere herein. For example, system configuration 200 may be similar to system 130 as illustrated and described with respect to FIG. 1B.

System configuration 200 includes a shaft 202 that is configured to rotate about a rotational axis 204. Cams 208 and 210 are coupled to the shaft 202. The cam 210 may include an involute portion 218 and a circular portion 220. System configuration 200 may further include a first linear actuator 232 and a second linear actuator 234. The first linear actuator 232 may be coupled to the involute portion 218 of the cam 210. The second linear actuator 234 may be coupled to the circular portion 220. As such, system configuration 200 may provide a torque via the first linear actuator 232, but not via the second linear actuator 234. That is, while the second linear actuator 234 is coupled to the circular portion 220, any force imparted on the cam 210 may have a force vector that passes through the axis of rotation 204.

In some example implementations, a pressure of the first and/or the second linear actuator 234 may be released or otherwise adjusted based on the current angle of the shaft 202. That is, while the shaft 202 rotates about the axis of rotation 204, the cylinder pressure may be adjusted based on angular ranges as shown and described in reference to FIG. 1C.

Figure 2B:
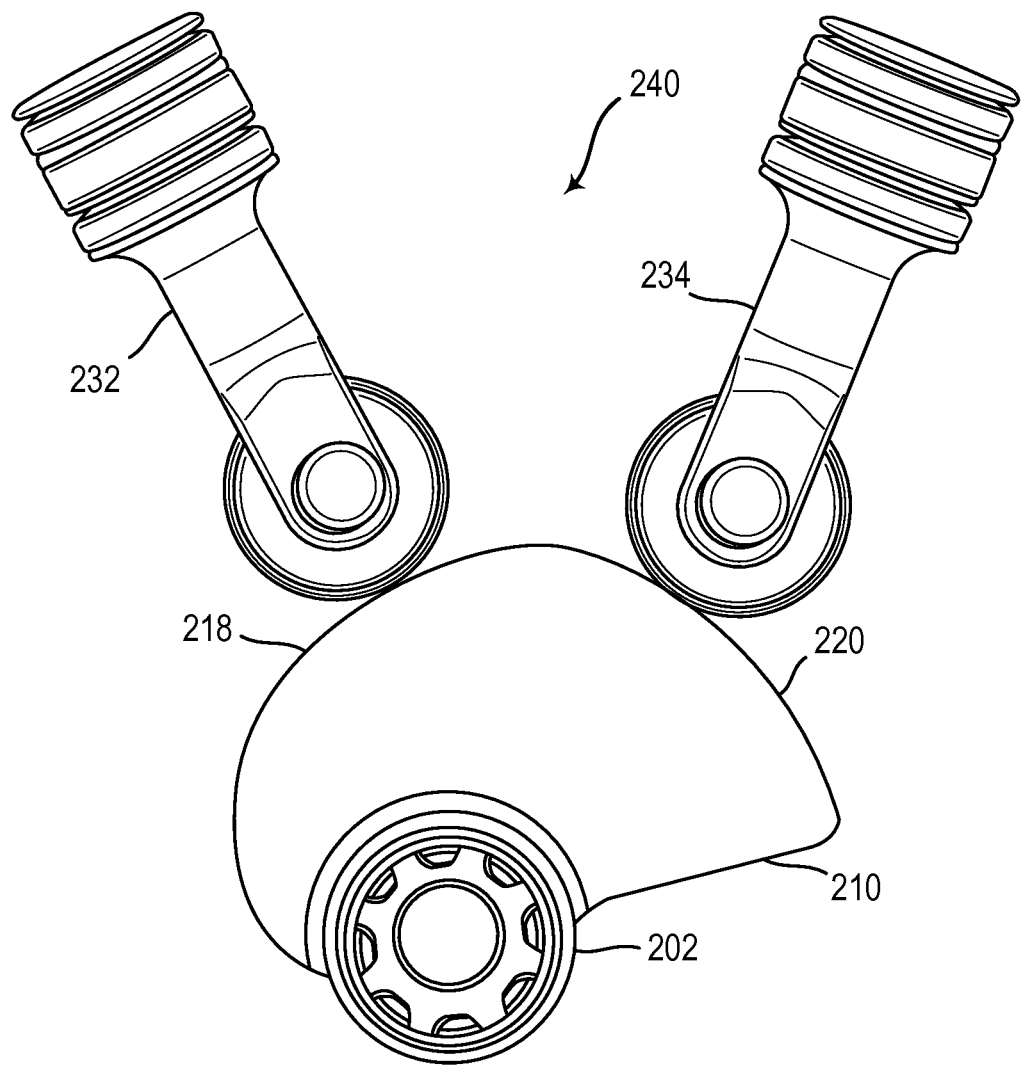
FIG. 2B illustrates a view of a system configuration, according to an example implementation.

FIG. 2B illustrates a view of a system configuration 240, according to an example implementation. The illustrated view includes the first linear actuator 232 being coupled to the involute portion 218 of the cam 210. The system configuration 240 includes the second linear actuator 234 being coupled to the circular portion 220 of cam 210. System configuration 240 may show the shaft 202 as rotated clockwise from the system configuration 200. System configuration 240 may correspond with angle range 154, as illustrated and described in reference to FIG. 1C.

Figure 2C:
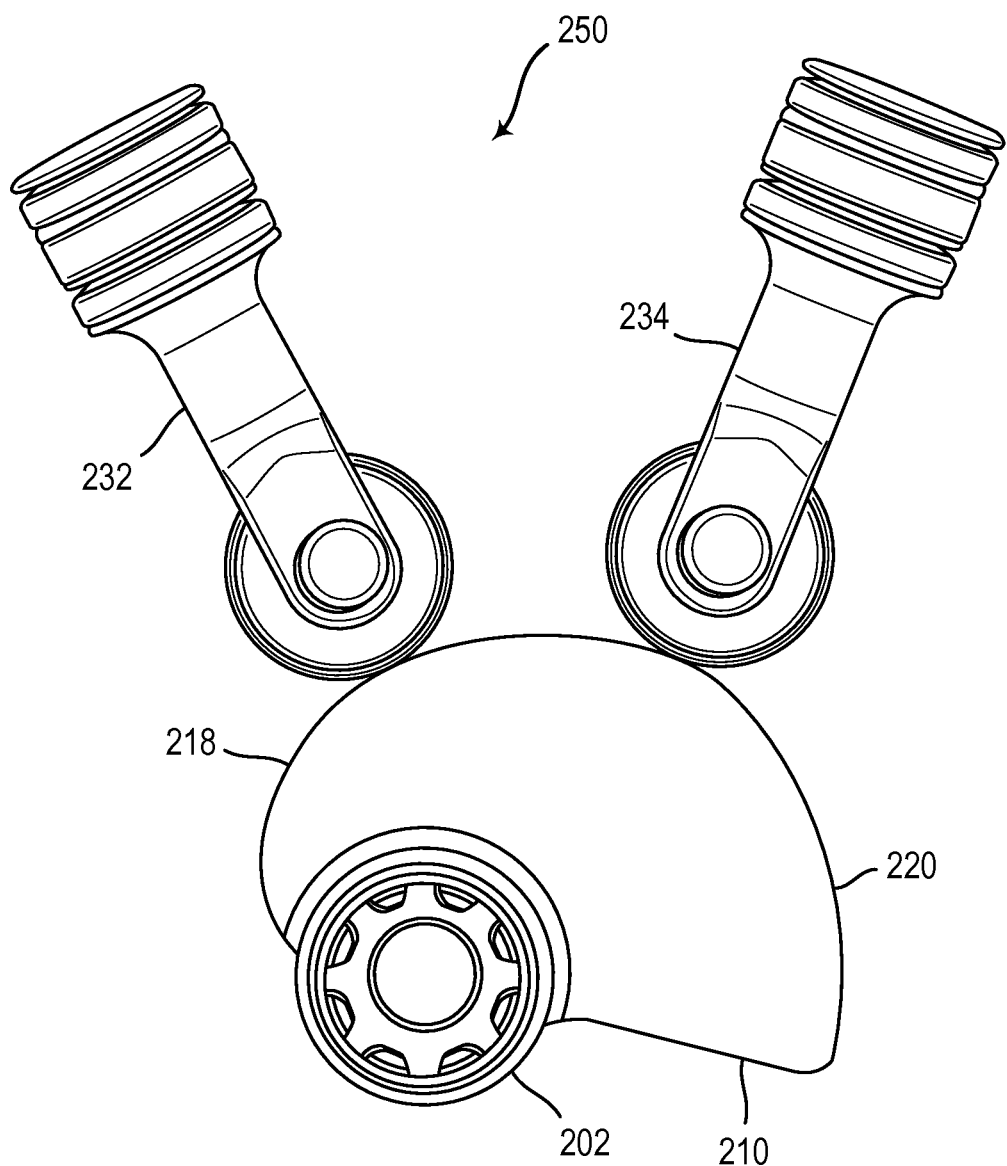
FIG. 2C illustrates a view of a system configuration, according to an example implementation.

FIG. 2C illustrates a view of a system configuration 250, according to an example implementation. System configuration 250 may include the shaft 202 as rotated clockwise from system configuration 240. Namely, the first linear actuator 232 and the second linear actuator 234 may be coupled to the involute portion 218 of cam 210. In such a configuration, both the first linear actuator 232 and the second linear actuator 234 may provide a clockwise torque on the shaft 202. Optionally, one or both of the linear actuators may be controlled so as to provide no torque on the shaft 202. System configuration 250 may correspond with angle range 156, as illustrated and described in reference to FIG. 1C.

Figure 2D:
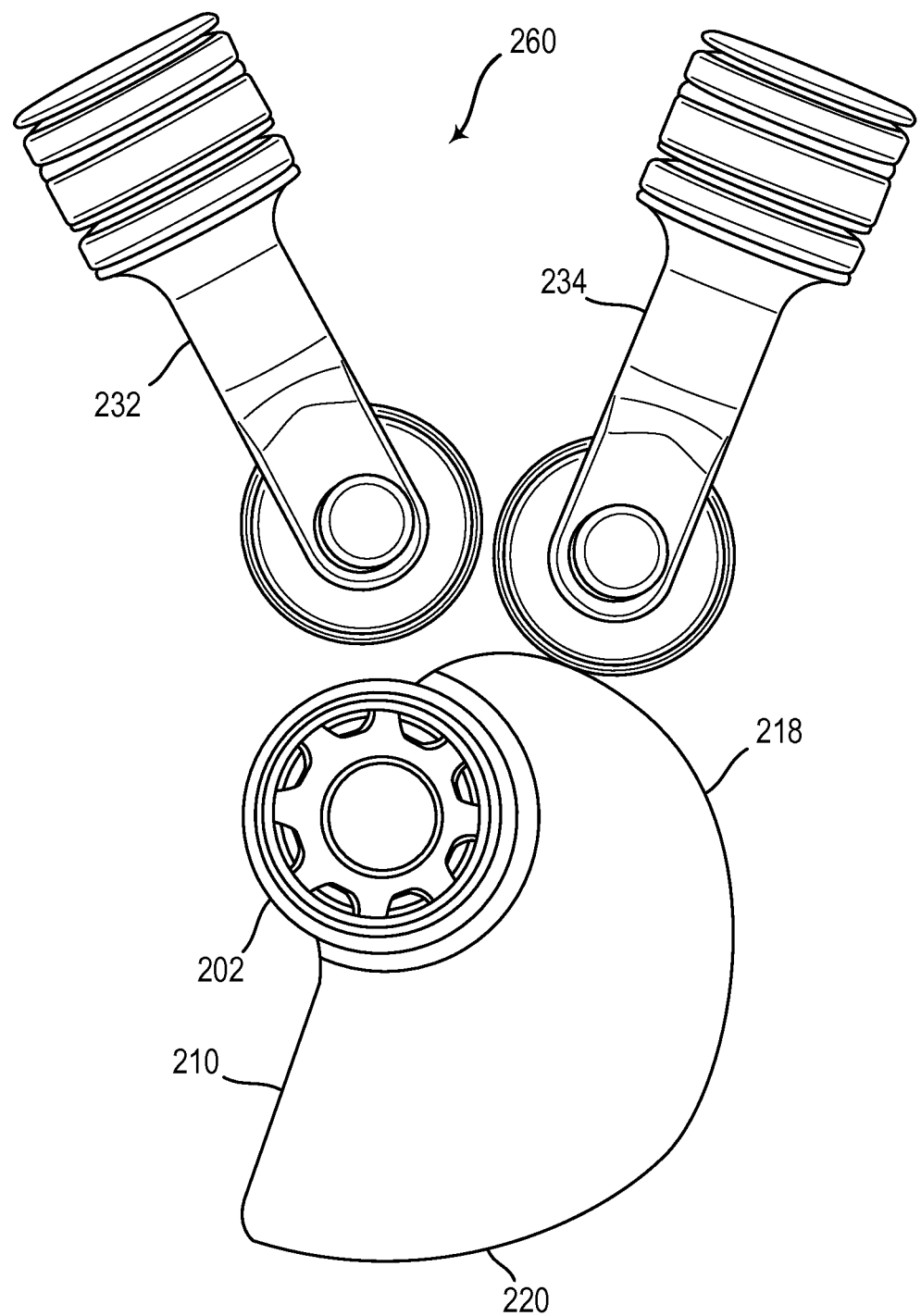
FIG. 2D illustrates a view of a system configuration, according to an example implementation.

FIG. 2D illustrates a view of a system configuration 260, according to an example implementation. In such a configuration, the first linear actuator 232 may be entirely decoupled from the cam 210 and the second linear actuator 234 may be coupled to the involute portion 218 of the cam 210. System configuration 260 may correspond with angle range 158, as illustrated and described in reference to FIG. 1C.

Figure 2E:
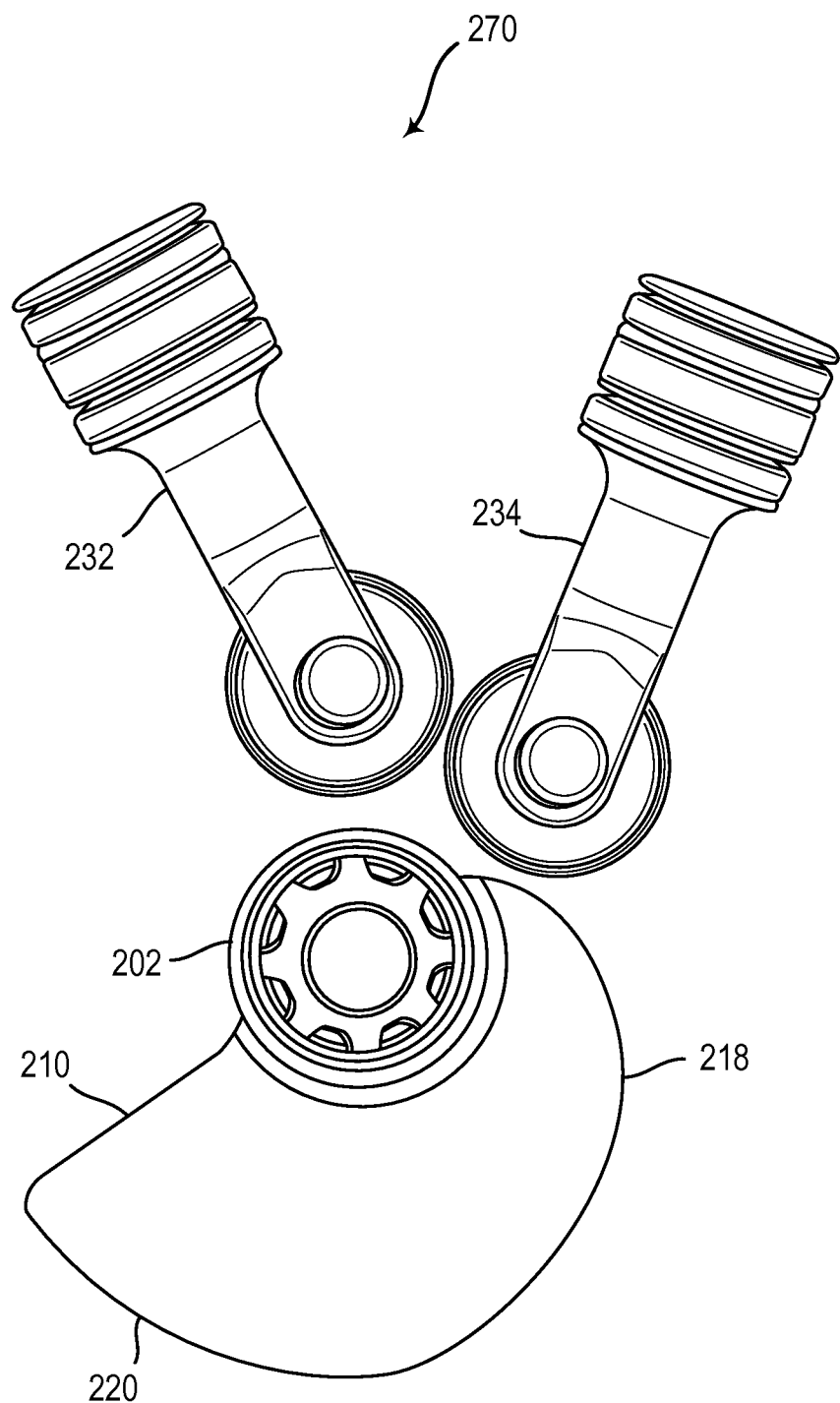
FIG. 2E illustrates a view of a system configuration, according to an example implementation.

FIG. 2E illustrates a view of a system configuration 270, according to an example implementation. In such a configuration, both the first linear actuator 232 and the second linear actuator 234 may be entirely decoupled from the cam 210. As such, no torque may be imparted on the shaft 202 or the cam 210. System configuration 260 may correspond with angle range 160, as illustrated and described in reference to FIG. 1C.

Figure 3A:
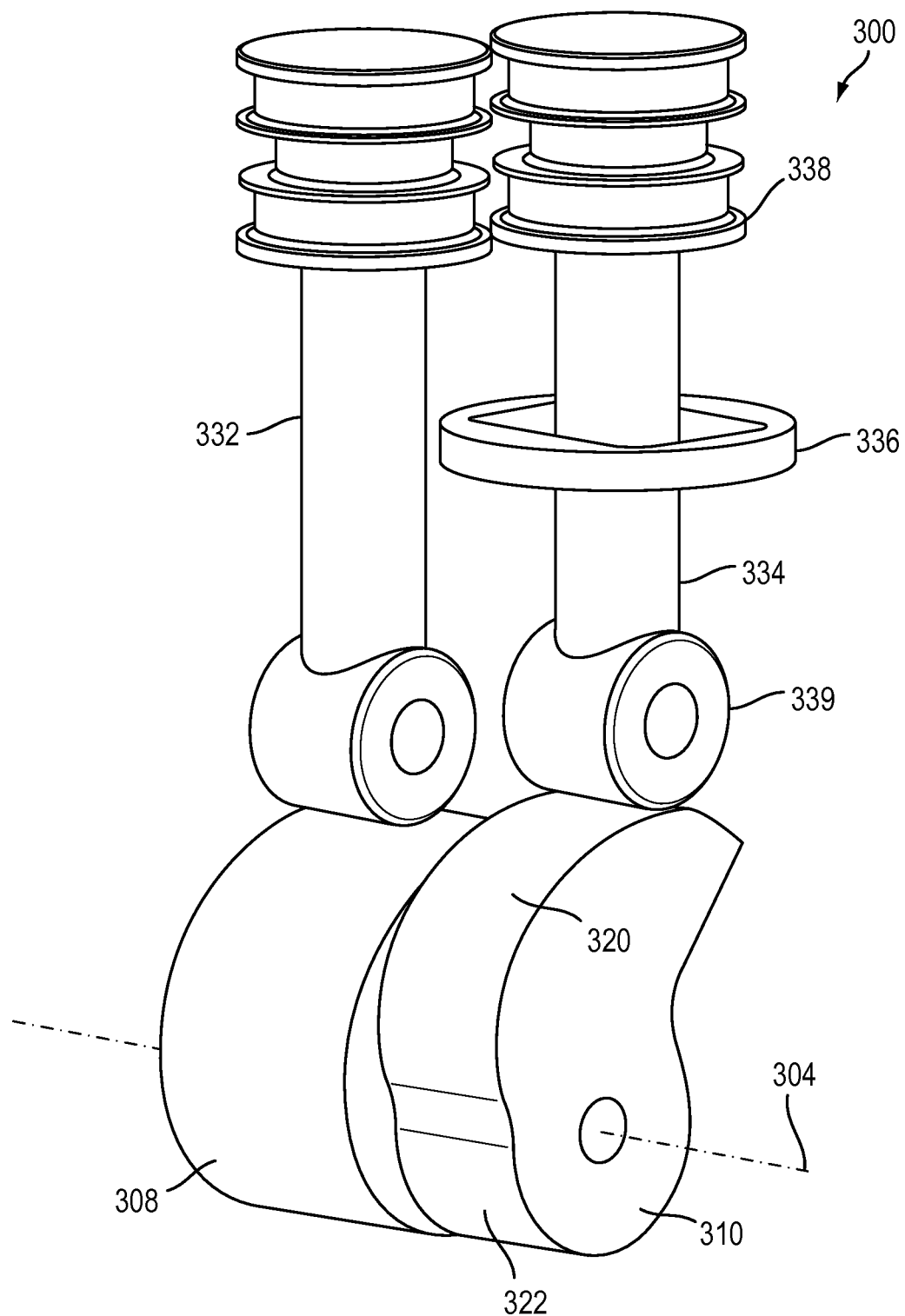
FIG. 3A illustrates a view of a system configuration, according to an example implementation.

FIG. 3A illustrates a view of a system configuration 300, according to an example implementation. System configuration 300 may include at least some elements that may be similar or identical to elements illustrated and described in relation to FIGS. 1A-1D and 2A-2E. Specifically, system configuration 300 includes a first cam 308 and a second cam 310, which may be coupled to a common shaft (not shown). The first cam 308 and the second cam 310 may be configured to rotate about an axis of rotation 304. The first cam 308 and the second cam 310 may have different cross-sectional shapes. That is, the first cam 308 may include an approximately involute shape and the second cam 310 may include an involute-shaped portion 320 and an optional circular-shaped portion 322.

The first cam 308 and the second cam 310 may include further portions. For example, either or both of the first cam 308 and the second cam 310 may include a transitional portion disposed on a circumference of the respective cam between the circular portion and the involute portion. The transitional portion may include a smoothly graded curve that provides a low-friction transition between the circular portion and the involute portions.

The system configuration 300 may include a first linear actuator 332 and a second linear actuator 334. The first linear actuator 332 and the second linear actuator 334 may have axes of motion that are substantially parallel to one another. Alternatively, the axes of motion of the first linear actuator 332 and the second linear actuator 334 need not be along a common plane.

As illustrated in FIG. 3A, both the first linear actuator 332 and the second linear actuator 334 are coupled to the involute-shaped portions of the first cam 308 and the second cam 310. In such a scenario, a torque may be imparted to the common shaft by either or both of the first linear actuator 332 and the second linear actuator 334.

The second linear actuator 334 may include a bottom element 338 and a stop 336. The bottom element 338 may be a seal, a gland, or another body configured to interact with the stop 336. The stop 336 may include a ring or another type of physically rigid body configured to prevent a movement of the bottom element 338 along an axis of motion. In an example implementation, the second linear actuator 334 may be coupled to the second cam 310 and may impart a force to the second cam 310. For example, the second linear actuator 334 may include a hydraulic cylinder and a hydraulic pressure may be maintained in the cylinder so as to cause the second linear actuator to apply a torque on the second cam 310 about rotational axis 304.

The first linear actuator 332 and the second linear actuator 334 may include a rolling/sliding surface 339. In an example embodiment, the rolling/sliding surface 339 may be a roller bearing or a wheel that may be configured to roll along a surface of the first cam 308 or the second cam 310.

Figure 3B:
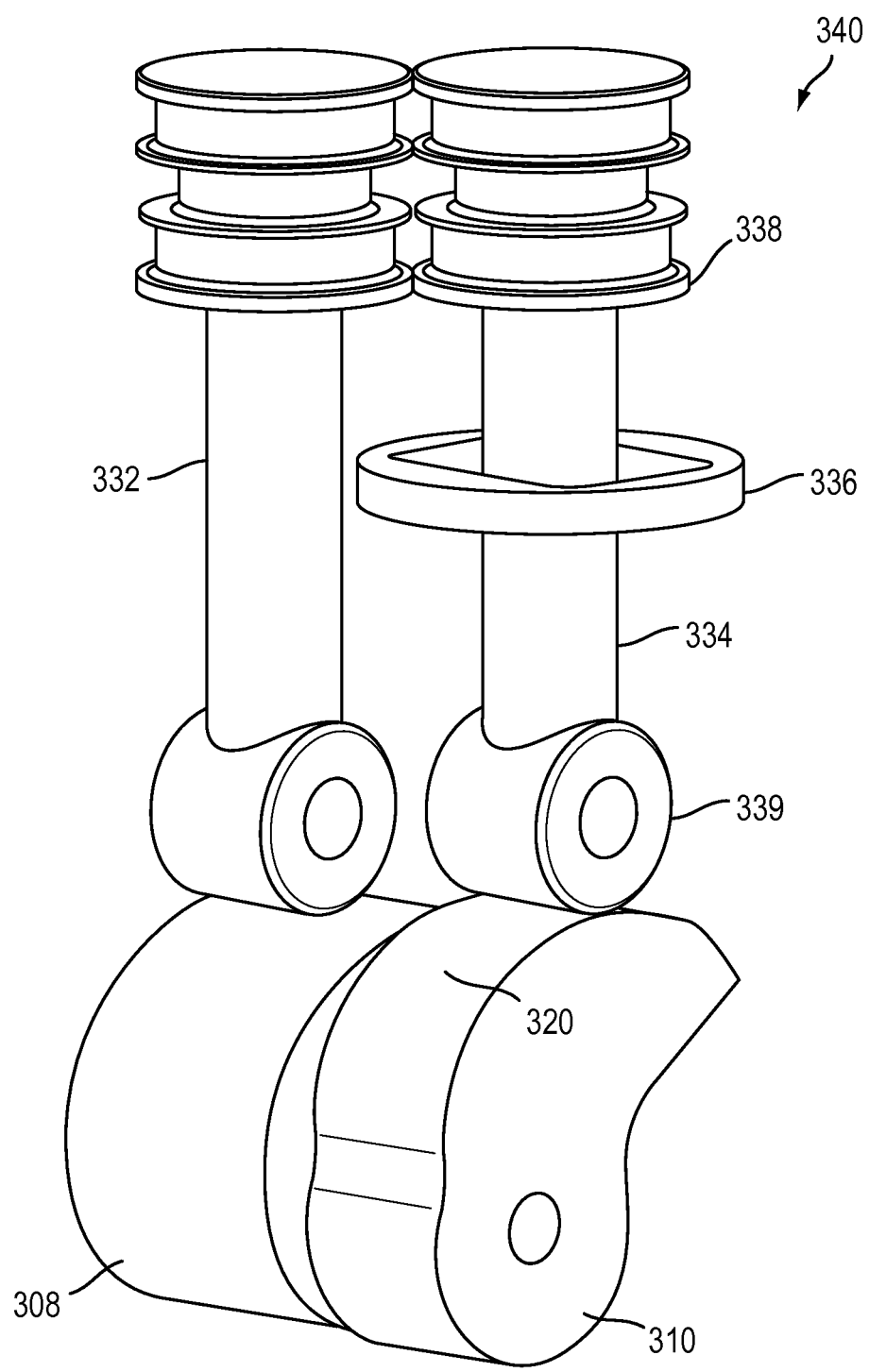
FIG. 3B illustrates a view of a system configuration, according to an example implementation.

FIG. 3B illustrates a view of a system configuration 340, according to an example implementation. System configuration 340 may include the first cam 308 and the second cam 310 rotated clockwise from system configuration 300. Furthermore, the first linear actuator 332 and the second linear actuator 334 may be extended further downwards compared to system configuration 300.

Figure 3C:
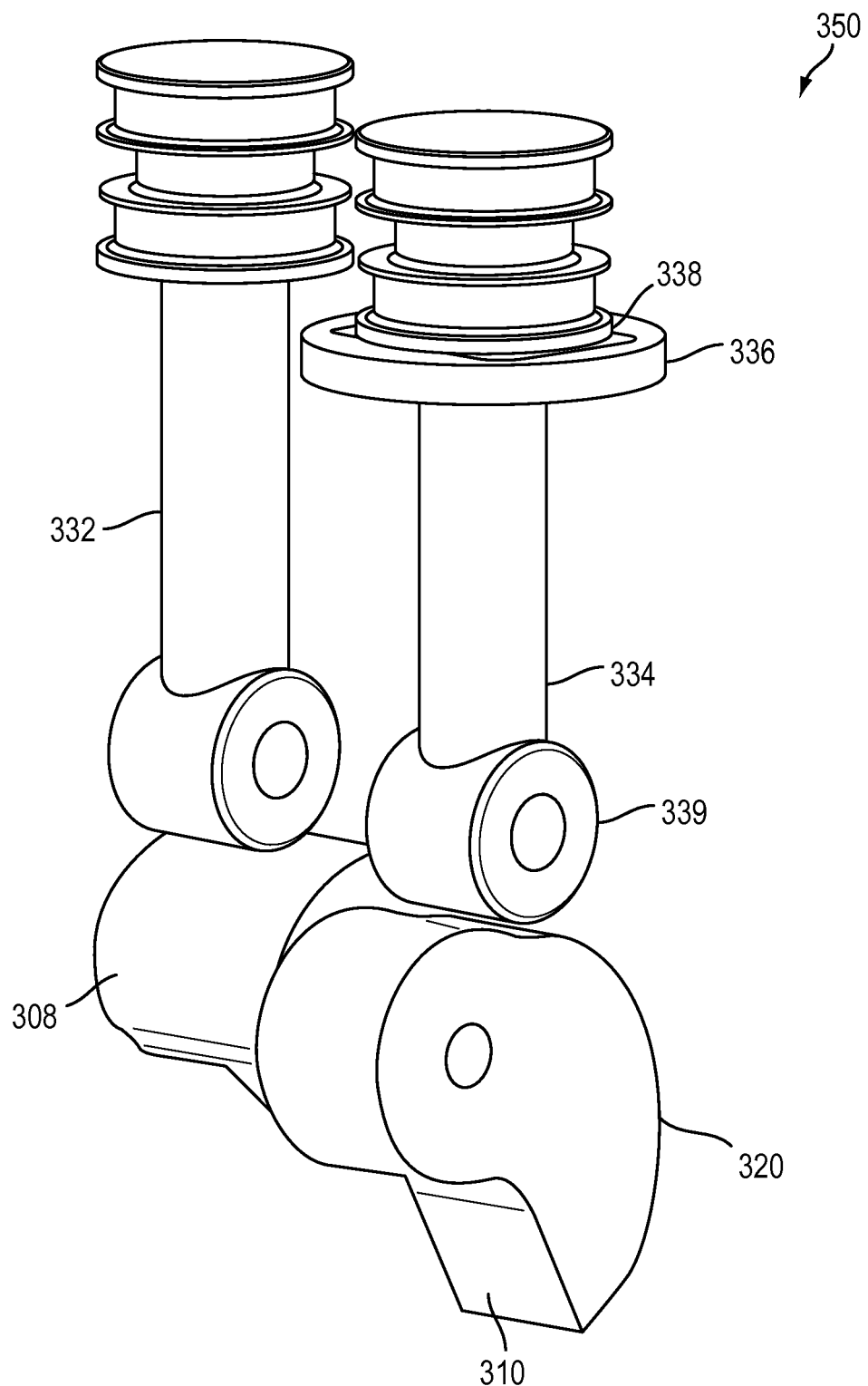
FIG. 3C illustrates a view of a system configuration, according to an example implementation.

FIG. 3C illustrates a view of a system configuration 350, according to an example implementation. System configuration 350 includes the bottom element 338 of the second linear actuator 334 being physically limited or blocked by stop 336 at a particular stop position. That is, as the second linear actuator 334 moves downwards along its axis of motion, it may come in contact with the stop 336 at the stop position. In such a scenario, the second linear actuator 334 may become decoupled from the second cam 310. As such, the second linear actuator 334 may no longer be operable to impart a force on the second cam 310. The first linear actuator 332 may still be operable to provide a force on the first cam 308.

Figure 3D:
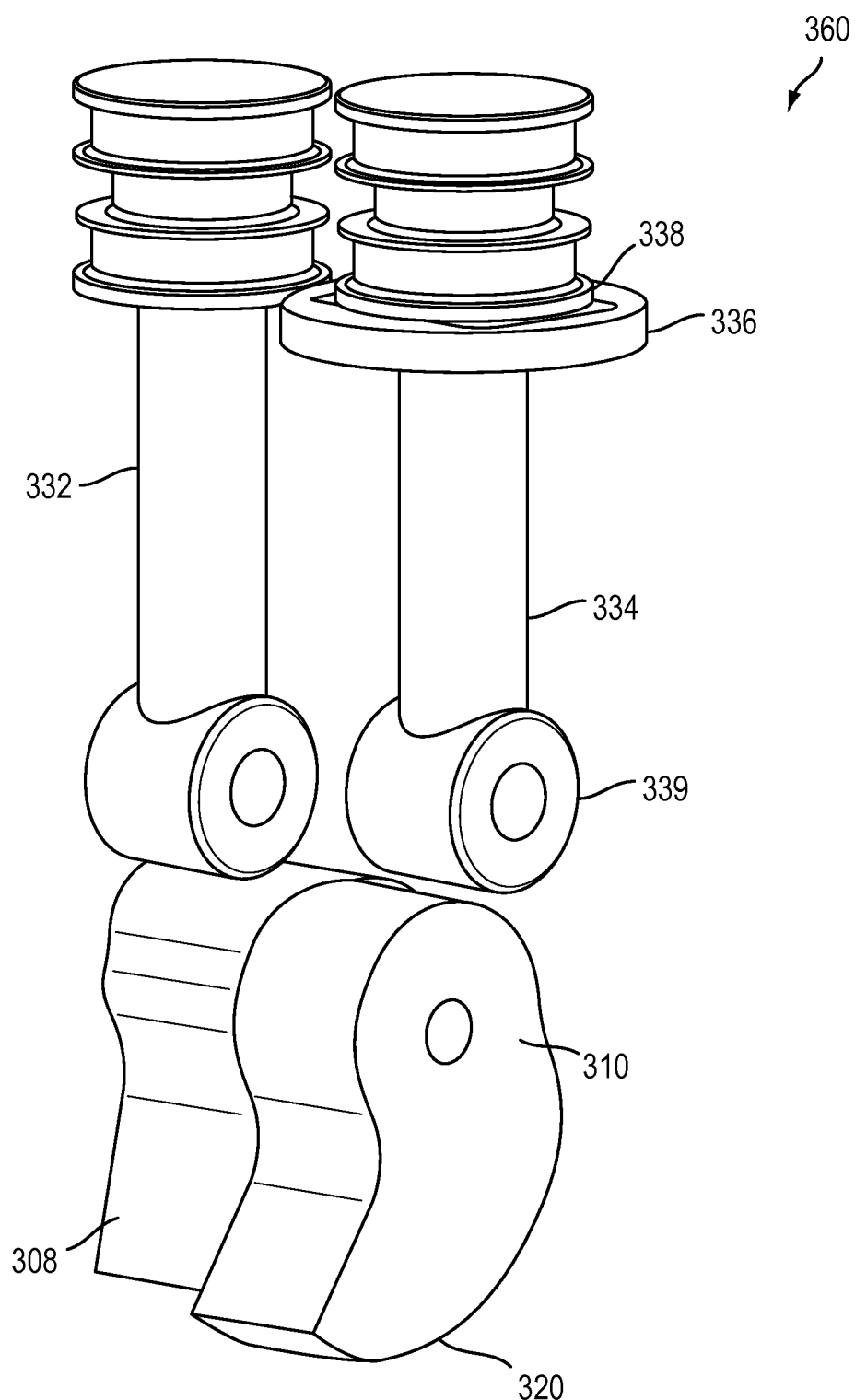
FIG. 3D illustrates a view of a system configuration, according to an example implementation.

FIG. 3D illustrates a view of a system configuration 360, according to an example implementation. System configuration 360 may include the first cam 308 and the second cam 310 being rotated further clockwise from the system configuration 350. Furthermore, the first linear actuator 332 may be coupled to the first cam 308 and extended further downward with respect to system configuration 350. The second linear actuator 334 may be decoupled from the second cam 310 due to the bottom element 338 being in contact with the stop 336.

Figure 3E:
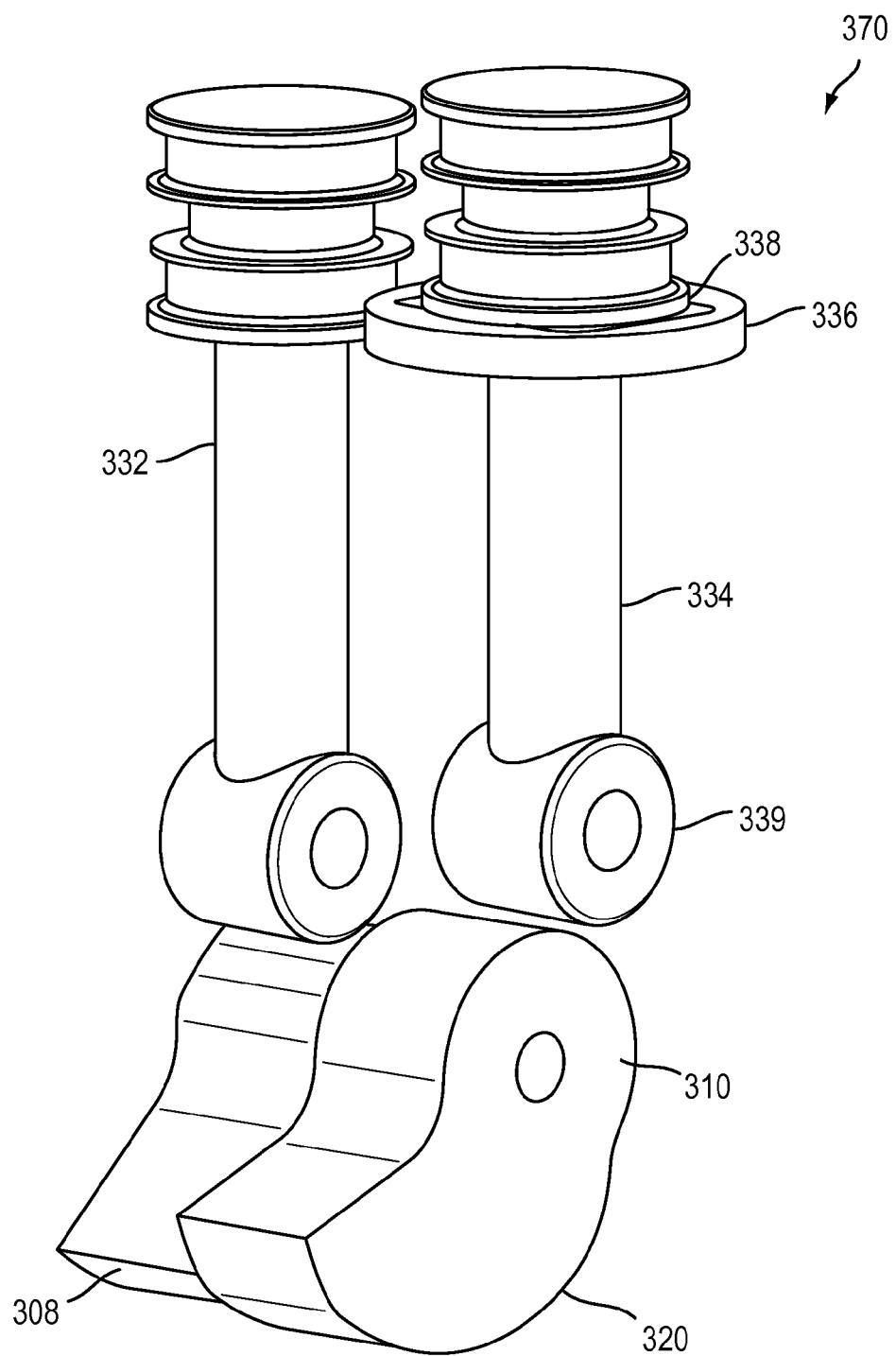
FIG. 3E illustrates a view of a system configuration, according to an example implementation.

FIG. 3E illustrates a view of a system configuration 370, according to an example implementation. System configuration 370 may include the first cam 308 and the second cam 310 being rotated yet further clockwise with respect to system configuration 360. In such a scenario, the first linear actuator 332 and the second linear actuator 334 may be decoupled from the first cam 308 and the second cam 310, respectively. For example, the first linear actuator 332 may interact with an associated stop (not shown), similar or identical to stop 336, so as to decouple the first linear actuator 332 from the first cam 308.

It will be recognized that other system configurations are considered within the scope of this disclosure. Namely, system configurations are contemplated that may include further cams, further linear actuators, and further shafts. System configuration with more cams, and/or more cam portions, and/or more linear actuators may be operable to more finely control a torque applied to a common shaft.

Additionally or alternatively, further portions of cams are possible. For example, multiple involute or non-involute shaped portions may be included on a given cam. Furthermore, one or more transition portions may be disposed along a circumference of a given cam. The one or more transition portions may smooth the shape of the given cam from an involute shape to a circular shape. Other cam portions with different shapes are possible.

The particular arrangements shown in the figures should not be viewed as limiting. It should be understood that other implementations may include more or less of each element shown in a given figure. Further, some of the illustrated elements may be combined or omitted. Yet further, an illustrative implementation may include elements that are not illustrated in the figures.

While various examples and implementations have been disclosed, other examples and implementations will be apparent to those skilled in the art. The various disclosed examples and implementations are for purposes of illustration and are not intended to be limiting, with the true scope being indicated by the following claims.

What is claimed is:

1. A system comprising:
a shaft;
at least one cam coupled to the shaft, wherein cross-sections of each cam of the at least one cam comprise respective approximately involute portions;
a first linear actuator comprising a first axis;
a second linear actuator comprising a second axis, wherein the first linear actuator and the second linear actuator are detachably coupled to the at least one cam, and wherein the first linear actuator and the second linear actuator, when coupled to the at least one cam, exert respective forces on the at least one cam so as to impart respective torques on the shaft, wherein the respective torques are applied in the same direction with respect to a rotational axis of the shaft, wherein at least one of the first linear actuator or the second linear actuator is disengaged from the at least one cam, wherein disengaging from the at least one cam comprises each disengaged linear actuator imparting a lower torque on the shaft compared to each respective linear actuator when engaged, wherein disengaging from the at least one cam comprises reducing at least one of a hydraulic or pneumatic pressure of each disengaged linear actuator; and
a controller, wherein the controller comprises a memory and a processor, wherein the processor is configured to carry out instructions stored in the memory, the instructions including adjusting at least one of a hydraulic or pneumatic pressure of each disengaged linear actuator based on at least one of a reference angle of the shaft or a reference position of each disengaged linear actuator along a respective axis.

2. The system of claim 1 wherein the at least one cam consists of a single cam, wherein the first linear actuator and the second linear actuator are detachably coupled to the single cam.

3. The system of claim 1 wherein the at least one cam comprises a first cam and a second cam, wherein the first linear actuator is detachably coupled to the first cam, wherein the second linear actuator is detachably coupled to the second cam, wherein the first cam is coupled to the second cam, and wherein the first cam and the second cam are arranged along the rotational axis.

4. The system of claim 1 wherein a first cam of the at least one cam further comprises an approximately circular portion, wherein each disengaged linear actuator is coupled to the approximately circular portion.

5. The system of claim 4 wherein the first cam further comprises a second approximately circular portion, wherein the approximately circular portion of the first cam comprises a smaller radius than the second approximately circular portion of the first cam.

6. The system of claim 5 wherein the at least one of the first linear actuator or the second linear actuator is to disengaged from the first cam while coupled to the approximately circular portion or the second approximately circular portion of the first cam.

7. The system of claim 1 wherein disengaging from the at least one cam comprises each disengaged linear actuator decoupling from the at least one cam based on at least one of a reference position of each disengaged linear actuator along a respective axis.

8. The system of claim 7 further comprising at least one stop, wherein the decoupling from the at least one cam comprises each disengaged linear actuator contacting the at least one stop.

9. The system of claim 1 wherein reducing the at least one of a hydraulic or pneumatic pressure of each disengaged linear actuator is in response to at least one of a reference angle of the shaft or a reference position of each disengaged linear actuator along a respective axis.

10. The system of claim 1, wherein adjusting the at least one of a hydraulic or pneumatic pressure of each disengaged linear actuator comprises opening a relief valve so as to depressurize the respective disengaged linear actuator.

11. The system of claim 1 further comprises at least one servovalve coupled to each disengaged linear actuator and wherein adjusting the at least one of a hydraulic or pneumatic pressure of each disengaged linear actuator comprises controlling a valve position of the at least one servovalve.

12. A system comprising:
a shaft;
a first cam coupled to the shaft, wherein a cross-section of the first cam comprises a first involute portion;
a second cam coupled to the shaft, wherein a cross-section of the second cam comprises a second involute portion;
a first linear actuator comprising a first axis, wherein the first linear actuator is detachably coupled to the first involute portion of the first cam, wherein the first linear actuator, when coupled to the first cam, exerts a first force on the first cam so as to impart a first torque on the shaft;
a second linear actuator comprising a second axis, wherein the second linear actuator is detachably coupled to the second cam based on at least one of a reference angle of the shaft or a reference position of the second linear actuator along the second axis, wherein the second linear actuator, when coupled to the second cam, exerts a second force on the second cam so as to impart a second torque on the shaft, and wherein the first torque and the second torque are applied in the same direction with respect to a rotational axis of the shaft, wherein at least one of: the first linear actuator is disengaged from the first cam or the second linear actuator is disengaged from the second cam, wherein the respective linear actuator disengaging from the respective cam comprises the respective linear actuator imparting a lower torque on the shaft compared to the respective linear actuator when engaged, wherein the respective linear actuator disengaging from the respective cam comprises reducing at least one of a hydraulic or pneumatic pressure of the respective disengaged linear actuator; and a controller, wherein the controller comprises a memory and a processor, wherein the processor is configured to carry out instructions stored in the memory, the instructions including adjusting at least one of a hydraulic or pneumatic pressure of the respective disengaged linear actuator based on at least one of a reference angle of the shaft or a reference position of the respective disengaged linear actuator along a respective axis.

13. The system of claim 12 wherein the first linear actuator imparts a force on the first cam along the first axis while coupled to the first involute portion of the first cam, wherein the second linear actuator imparts a force on the second cam along the second axis while coupled to the second involute portion of the second cam.

14. The system of claim 12 wherein the first linear actuator and the second linear actuator disengage a hydraulic or pneumatic pressure in response to at least one of the reference angle of the shaft being within a predetermined angle range, the reference position of the first linear actuator reaching a first stop position, or the reference position of the second linear actuator reaching a second stop position.

15. The system of claim 14, further comprising a stop, wherein the stop decouples the second linear actuator from the second cam while the second reference position of the second linear actuator is at the second stop position.

16. The system of claim 12 wherein, while the first linear actuator is coupled proximate to the first involute portion of the first cam and the second linear actuator is coupled proximate to the second involute portion of the second cam, the reference angle of the shaft is within a first angular range.

17. The system of claim 16 wherein, while the second linear actuator is decoupled from the second cam, the reference angle of the shaft is within a second angular range.

\* \* \* \* \*